(12) United States Patent
Chauvet et al.

(10) Patent No.: US 8,291,186 B2
(45) Date of Patent: Oct. 16, 2012

(54) VOLUME RECORD DATA SET OPTIMIZATION APPARATUS AND METHOD

(75) Inventors: Philip R. Chauvet, Tucson, AZ (US); David Charles Reed, Tucson, AZ (US); Michael Robert Scott, Ocean View, HI (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 12/196,281

(22) Filed: Aug. 21, 2008

(65) Prior Publication Data

US 2010/0049937 A1 Feb. 25, 2010

(51) Int. Cl.
*G06F 12/00* (2006.01)
*G06F 13/00* (2006.01)
*G06F 13/28* (2006.01)

(52) U.S. Cl. ........ 711/170; 711/156; 711/112; 711/114; 711/158; 707/736; 707/748

(58) Field of Classification Search .................. 711/156, 711/112, 114, 158, 170; 707/736, 748
See application file for complete search history.

(56) References Cited

U.S. PATENT DOCUMENTS

| | | | |
|---|---|---|---|
| 5,566,348 A | 10/1996 | Dahman et al. | |
| 6,209,067 B1 * | 3/2001 | Collins et al. | 711/158 |
| 7,158,999 B2 | 1/2007 | Pace et al. | |
| 7,356,493 B2 | 4/2008 | Choi et al. | |
| 8,112,603 B2 * | 2/2012 | Dow | 711/165 |

OTHER PUBLICATIONS

Scheinberg, Katya, An Efficient Implementation of an Active Set Method for SVMs, The Journal of Machine Learning Research, vol. 7, Dec. 2006, pp. 2237-2257, ISSN:1533-7928.
Baeza-Yates, Ricardo, Aristides Gionis, Flavio Junqueira, Vanessa Murdock, Vassilis Plachouras, Fabrizio Silvestri, The Impact of Caching on Search Engines, Proceedings of the 30th Annual International ACM SIGIR Conference on Research and Development in Information Retrieval, 2007, Amsterdam, The Netherlands, pp. 183-190, ISBN:978-1-59593-597-7.

\* cited by examiner

*Primary Examiner* — Stephen Elmore
*Assistant Examiner* — Mark Giardino, Jr.
(74) *Attorney, Agent, or Firm* — Nelson and Nelson; Daniel P. Nelson; Alexis V. Nelson

(57) ABSTRACT

A method, apparatus, and computer program product for optimizing the organization of volume records stored in a volume record data set is disclosed herein. In certain embodiments, a method may include monitoring a volume comprising multiple data sets. Each data set may have associated therewith a volume record stored in a volume record data set. The method may further include tracking read and write operations to each of the data sets over a period of time. A count value may be stored in the volume record of each data set. The count value may be increased each time a read operation is performed to the associated data set. The count value may be decreased each time a write operation is performed to the associated data set. The volume records in the volume record data set may then be reorganized according to the size of the count values.

18 Claims, 5 Drawing Sheets

VOLUME RECORD DATA SET OPTIMIZATION APPARATUS AND METHOD

FIELD OF THE INVENTION

This invention relates to data storage management systems, and more particularly to apparatus and methods for optimizing the storage of volume records in volume record data sets.

BACKGROUND OF THE INVENTION

In the z/OS operating system, VSAM volume data sets (VVDSs) are data sets that describe the characteristics of virtual storage access method (VSAM) and storage management subsystem (SMS) managed data sets residing on direct access storage device (DASD) volumes. These VVDSs typically reside on the same volumes where the VSAM and SMS-managed (non-VSAM) data sets reside. Every volume containing VSAM or SMS-managed data sets will typically contain a VVDS to describe the data sets that are stored thereon.

A VVDS typically contains three types of entries, or records: a VSAM volume control record (VVCR) that contains BCS back pointers and information to manage DASD space; a VSAM volume record (VVR) for each VSAM data set on the volume and containing information about the VSAM data set; and a non-VSAM volume record (NVR) for each non-VSAM data set on the volume and containing information about the non-VSAM data set.

VVDS access is required whenever VSAM data sets and SMS-managed data sets are processed (e.g., read, written, updated, etc.) on DASDs. This requires physical I/O to the volume(s) that the data sets reside, both to access the VVDS as well as the data sets described in the VVDS. This is a performance bottleneck as there may be several physical I/O's to the volume to open and/or modify the VVDS associated with a particular data set, in addition to the I/O's required to access the data set itself.

To speed up access to the VVDS and improve performance when accessing VSAM or SMS-managed data sets, all or part of the VVRs or NVRs of a VVDS may be stored in a cache. The cache, for example, may be provided in a coupling facility accessible by one or more mainframe processors. When a processor attempts to access a data set, the processor may access all or part of the corresponding VVDS in the coupling facility cache instead of accessing the VVDS in the DASD volume where it resides.

To realize the benefits of a cache, it is desirable to store VVDS records (i.e., VVRs, NVRs, etc.) for data sets that are primarily read access in the cache. If the data sets are frequently the subject of write operations, the VVDS records will need to be updated frequently, requiring the VVDS records to be frequently written out to disk (i.e., by "destaging" the cache). This may significantly reduce the performance advantages of the cache.

Records subject to read operations do not incur such a performance penalty because they can reside in cache without needing to be repeatedly written out to disk. That is, once these records are loaded into the cache, the VVDS records can be repeatedly read from cache without needing to access the disk where the VVDS resides. Unfortunately, when performing I/O in the z/OS environment, I/O is performed on a block of records, as opposed to individual records. Thus, if one or more records of the block are the subject of a write operation, the entire block of records may need to be written out to disk, even if most of the records are primarily subject to read operations. This significantly reduces the performance advantages of the cache.

In view of the foregoing, what are needed are apparatus and methods to optimize the organization of volume records (i.e., VVRs and NVRs) in a VVDS. Ideally such an apparatus and method would significantly improve cache performance and reduce the need to frequently destage the cache. Further needed are apparatus and methods to dynamically optimize the performance of the cache as data usage changes over time.

SUMMARY

The invention has been developed in response to the present state of the art and, in particular, in response to the problems and needs in the art that have not yet been fully solved by currently available apparatus and methods. Accordingly, the invention has been developed to provide improved apparatus and methods to optimize the organization of volume records stored in a volume record data set. The features and advantages of the invention will become more fully apparent from the following description and appended claims, or may be learned by practice of the invention as set forth hereinafter.

Consistent with the foregoing, a method for optimizing the organization of volume records stored in a volume record data set is disclosed herein. In certain embodiments, such a method may include monitoring a volume comprising multiple data sets. Each data set may have associated therewith a volume record stored in a volume record data set. The method may further include tracking read and write operations to each of the data sets over a period of time. A count value may be stored in the volume record of each data set. The count value may be increased each time a read operation is performed to the associated data set. The count value may be decreased each time a write operation is performed to the associated data set. The volume records in the volume record data set may then be reorganized according to the size of the count values.

In yet another embodiment of the invention, a computer program product for optimizing a plurality of volume records stored in a volume record data set is disclosed. In certain embodiments, the computer program product may include a computer-usable medium having computer-usable program code embodied therein. The computer-usable program code may include code to monitor a volume comprising multiple data sets, wherein each data set has associated therewith a volume record, and each volume record is stored in a volume record data set. The computer-usable program code may also include code to track read and write operations to each of the data sets over a period of time and code to store a count value in the volume record of each data set. The count value may be increased each time a read operation is performed to the associated data set and decreased each time a write operation is performed to the associated data set. The computer-usable program code may also include code to reorganize the volume records in the volume record data set according to the size of the count values.

In yet another embodiment of the invention, an apparatus for optimizing a plurality of volume records stored in a volume record data set is disclosed herein. Such an apparatus may include a tracking module to monitor a volume comprising a plurality of data sets, wherein each data set has associated therewith a volume record, and each volume record is stored in a volume record data set. The tracking module may be further configured to track read and write operations to each of the data sets over a period of time. A count module may store a count value in the volume record of each data set. The count module may increase the count value each time a read operation is performed to the associated data set, and decrease the count value each time a write operation is performed to the associated data set. A reorganization module may reorganize the volume records in the volume record data set according to the size of the count values.

In yet another embodiment of the invention, method for optimizing a plurality of volume records stored in cache may include monitoring a volume including multiple data sets, wherein each data set is associated with a volume record, and each volume record is stored in a volume record data set. The method may include tracking read and write operations to each of the data sets over a period of time. The method may further include reorganizing the volume records in the volume record data set such that volume records for data sets with a larger number of read operations relative to write operations are grouped together, and volume records for data sets with a smaller number of read operations relative to write operation are grouped together.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
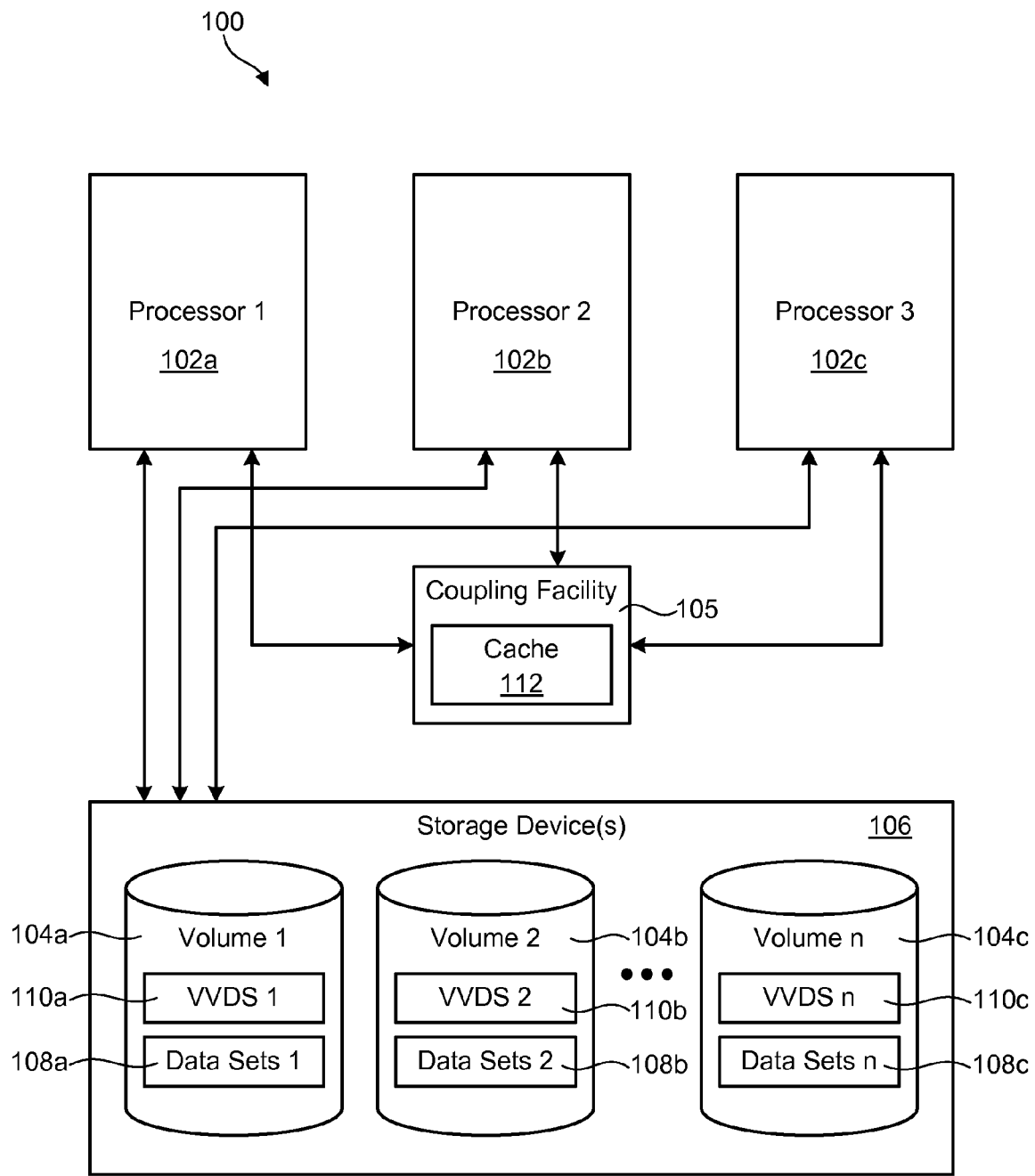
FIG. 1 is a high-level block diagram of one embodiment of a system for implementing a method and apparatus in accordance with the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one embodiment of a system 100 for implementing a method and apparatus in accordance with the invention is illustrated. In the illustrated embodiment, the system 100 may include an IBM Sysplex® system 100. Nevertheless, embodiments of the invention are not limited to Sysplex® systems 100 but may include any comparable or analogous system, regardless of the manufacturer, product name, or components or component names associated with the system. Furthermore, any system that could benefit from one or more embodiments of the invention is deemed to fall within the scope of the invention. Moreover, apparatus and methods in accordance with the invention may be used with any system that exhibits the same issues or problems disclosed herein. Such systems are also deemed to fall within the scope of the present invention. Thus, the Sysplex® system 100 is presented only by way of example and is not intended to be limiting.

A Sysplex® system 100 may be configured to allow multiple mainframe processors 102a-c to act as a single unit and share the same data, while ensuring data integrity, enabling resource sharing, and performing workload balancing. For example, the processors 102a-c may share data stored in one or more storage device (e.g., DASD) volumes 104a-c. A coupling facility 105 may include computer hardware and/or software that enable the processors 102a-c to share the same data. In certain embodiments, the coupling facility 105 may include cache 112 to store information shared among the attached processors 102a-c.

As mentioned, the processors 102a-c may share data stored in one or more volumes 104a-c stored on one or more storage devices 106. The storage devices 106 may include single disk drives, arrays of disk drives, or other storage devices 106 known to those of skill in the art. The volumes 104a-c may reside on a single storage device 106 or multiple storage devices 106.

In selected embodiments, each of the volumes 104a-c may store one or more data sets 108a-c. These data sets 108a-c, for example, may include VSAM data sets, SMS-managed (non-VSAM) data sets, or the like. Similarly, each of the volumes 104a-c may include a volume record data set 110a-c, such as a VSAM volume data set (VVDS) 110a-c, to describe the characteristics of VSAM and SMS-managed data sets 108a-c residing on the particular volume 104a-c. As previously mentioned, a VVDS 110 may store a VSAM volume record (VVR) for each VSAM data set 108 residing on the volume 104, and a non-VSAM volume record (NVR) for each non-VSAM data set 108 residing on the volume 104. These volume records may store information about their respective data sets 108.

As previously mentioned, VVDS access is required whenever VSAM data sets and SMS-managed data sets are read from, written to, or updated on the volume 104. To speed up access to the VVDS 110, all or part of the VVDS 110 may be stored in the coupling facility cache 112. When a processor 102 attempts to access a data set 108, the processor 102 may access all or part of the corresponding VVDS 110 in the coupling facility cache 112 instead of accessing it in the volume 104 where it resides. As mentioned, to realize the benefits of a cache 112, it is desirable to store VVDS records for data sets 108 that are primarily read access in the cache 112. VVDS records for data sets 108 that are frequently written to will need to be updated, requiring the VVDS records to be frequently written out to the storage device 106.

Conventionally, when performing I/O in the z/OS environment, I/O is performed on a block of volume records in the VVDS 110, as opposed to individual records. Thus, if one or more volume records of the block are associated with data sets 108 that are the subject of a write operation, the entire block of records may need to be written out to the storage device 106, even if most of the records are associated with data sets 108 that are primarily read access. This significantly reduces the performance advantages of the cache 112.

Figure 2:
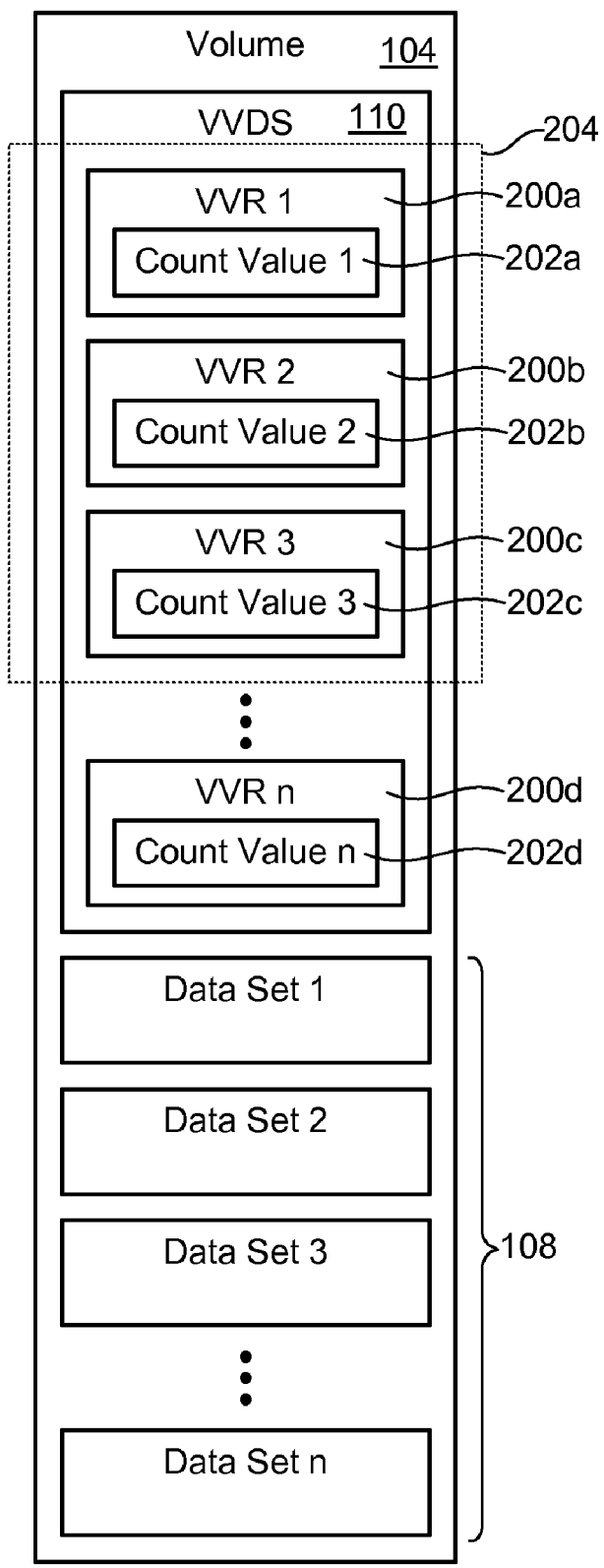
FIG. 2 is a high-level block diagram showing various data sets and volume records that may be stored in a volume.

Referring to FIG. 2, to address this problem, apparatus and methods in accordance with the invention may be used to group volume records 200 that are primarily read access and group volume records 200 that are primarily write access to enable more efficient utilization of the cache 112. FIG. 2 shows one example of a volume 104 containing one or more data sets 108 and a VVDS 110. The VVDS 110 may include multiple volume records 200a-d, one for each data set 108 in the volume 104. The volume records 200a-d may include both VSAM volume records (VVRs) and non-VSAM volume records (NVRs). For the purposes of this discussion, the volume records 200a-d are shown as VSAM volume records (VVRs) 200a-d. A block 204 may represent the group of records 200 that is read from or written to the VVDS 110 when performing I/O to the storage device 106.

In selected embodiments in accordance with the invention, a field in each volume record 200a-d may be provided to store a count value 202a-d. This count value 202a-d may be used to determine which data sets 108 are primarily read access as opposed to write access, and thus will be good candidates for caching. As will be explained in more detail hereafter, the volume records 200 may be reorganized within the VVDS 110 according to the count values 202 after some time has passed. The will ensure that whenever I/O is performed on the VVDS 110, the block 204 of records 200 that is read from or written to the VVDS 110 will contain records 200 that correspond to data sets 108 that are primarily read access or contain records 200 that correspond to data sets 108 that are primarily write access.

In certain embodiments, whenever a data set 108 is closed, the VVR 200 associated with the data set 108 will be updated as a part of the normal close processing of the data set 108. At that time, a field in the control block may be checked to determine if the data set 108 was open for read only, read/write, or write only processing. The count value 202 may then be updated in the VVR 200. If the data set was open for read only, the count value 202 may be increased (e.g., incremented by one). If the data set was open for write only, the count value 202 may be decreased (e.g., decremented by one). If the data set was open for read/write, the count value 202 may be left at its current value. Over time, the volume records 200 that are good candidates for caching will have a higher value than volume records 200 that are bad candidates for caching. Similarly, volume records 200 that were previously good candidates for caching may become bad candidates for caching, and vice versa, as the count values 202 change over time.

Figure 3:
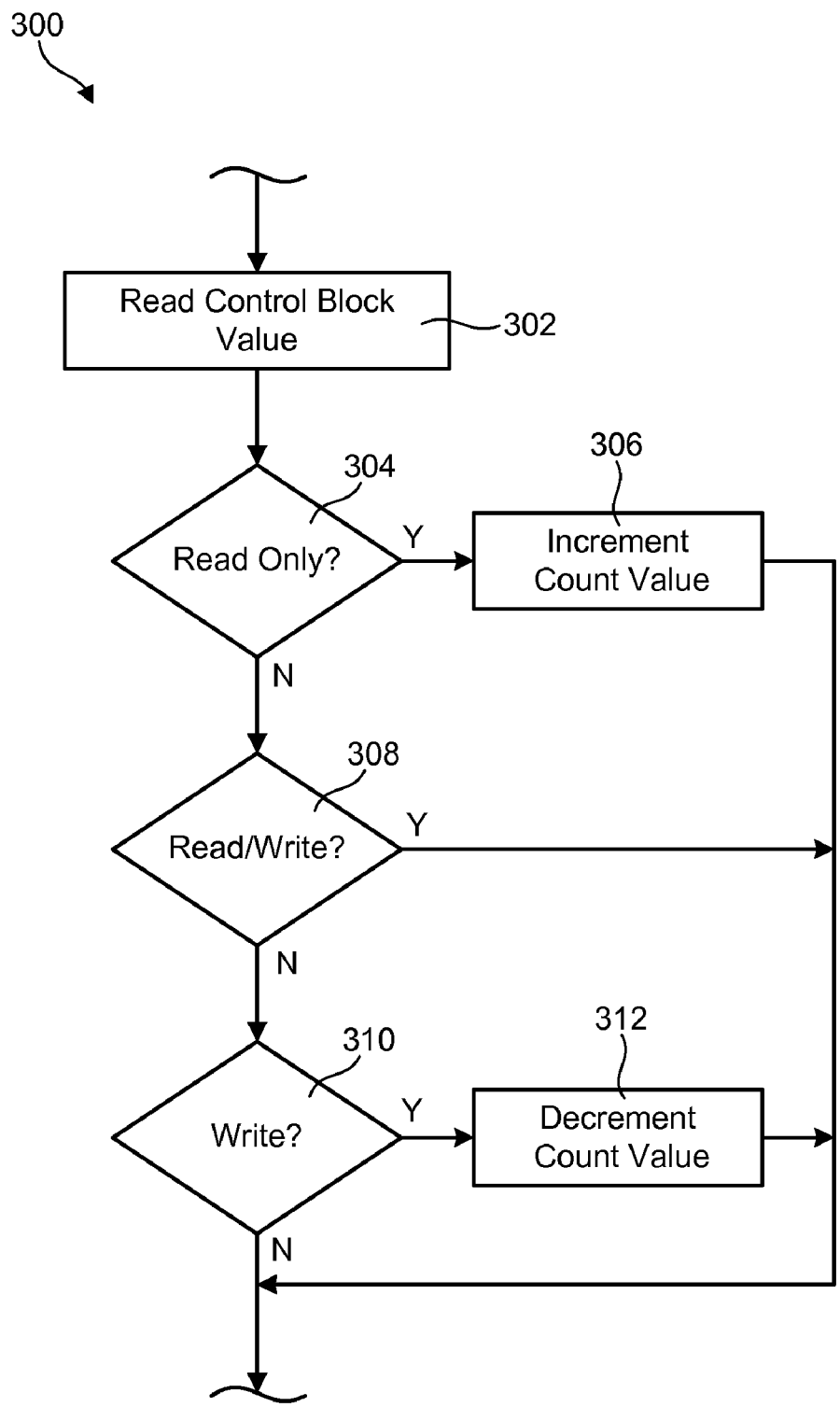
FIG. 3 is a flow chart of one embodiment of a method for maintaining a count value for each volume record.

For example, referring to FIG. 3, one embodiment of a method 300 for optimizing volume records 200 in a VVDS 110 may include reading 302 a control block value, such as during the close processing of a data set 108. The method 300 may then determine 304 whether the data set was open for read only. If so, the method 300 may increment 306 the count value 202 and proceed to the end of the method 300. If not, the method 300 may determine 308 whether the data set 108 was open for read/write. If so, the method 300 may leave the count value 202 at its current value and proceed to the end of the method 300. If not, the method 300 may determine 310 whether the data set 108 was open for write only. If so, the method 300 may decrement 312 the count value 202 and proceed to the end of the method 300.

The method 300 may be incorporated or inserted into any other method or process. For example, as previously mentioned, the method 300 may be incorporated into the close processing method of a data set 108. Furthermore, one of ordinary skill in the art will recognize that the term "increment" or "increase" may include adding a positive or negative number to the count value. Similarly, the term "decrement" or "decrease" may include adding a number of opposite sign to the count value.

Figures 4A, 4B, 4C:
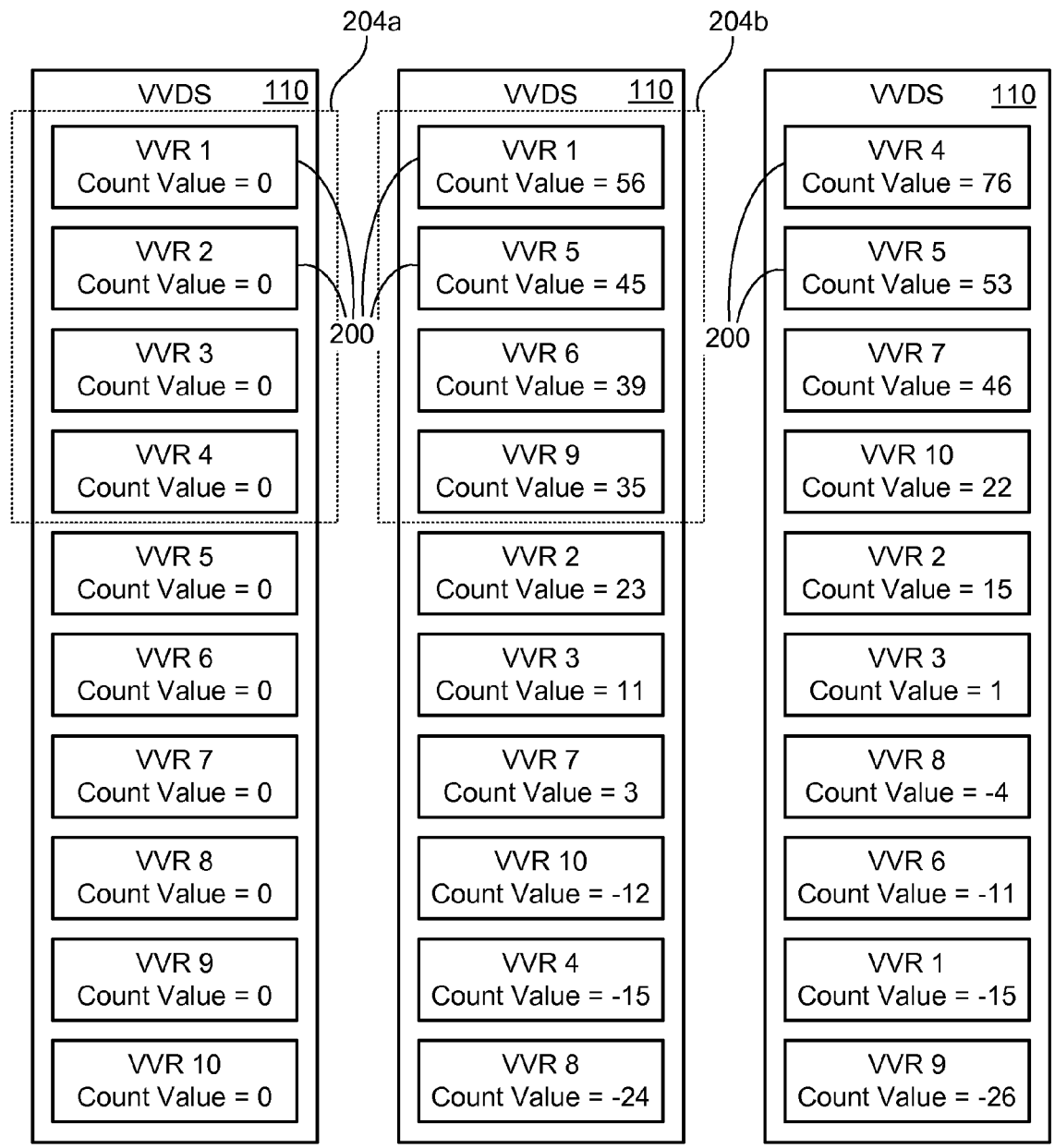
FIG. 4A is a high-level block diagram showing one example of volume records containing initial count values.
FIG. 4B is a high-level block diagram showing an example of volume records that are reorganized according to their count values after some time has passed.
FIG. 4C is a high-level block diagram showing an example of volume records that are reorganized again after additional time has passed.

Referring to FIG. 4A, prior to reorganizing the volume records 200 in the VVDS 110, the volume records 200 may be substantially randomly distributed throughout the VVDS 110. That is, volume records 200 for data sets 108 with a larger number of read operations relative to write operations may be interspersed with volume records for data sets with a smaller number of read operations relative to write operations. Thus an I/O block 204a may contain both types of volume records 200, creating an inefficient use of the cache 112.

Before modifying the count values 202 in the volume records 200, the count values 202 may be set to an initial value, such as zero or other number deemed suitable. In other embodiments, the count values 202 may be initialized based on historical records of read and write operations to the data sets 108. For example system measurement facility (SMF) records (e.g., SMF type 62, 14, and 15 records) may be used to determine past read and write activity with respect to particular data sets 108 in order to pre-populate the count values 202. Based on these values, the volume records 200 may be sorted and reorganized according to read and write activity prior to tracking read and write activity using the method of FIG. 3.

Referring to FIG. 4B, as time passes, the count values 202 may be modified each time a read or write is performed to the corresponding data sets 108. Volume records 200 for data sets 108 with a larger number of read operations relative to write operations will have a higher value, whereas volume records 200 for data sets 108 with a smaller number of read operations relative to write operation will have a lower number. After this process has executed for some time, the volume records 200 may be reorganized within the VVDS 110 according to count value 202. This may be accomplished by reading the volume records 200 from the VVDS 110, sorting them, and re-writing the records 200 to the VVDS 110 in the desired order. Reorganization may occur at specific time intervals, or whenever the count values 202 attain values that would warrant reorganization of the VVDS 110. FIG. 4B shows one example of volume records 200 after they have been reorganized according to count value 202. As can be seen, an I/O block 204b contains volume records 200 that are primarily read access, creating a more inefficient use of cache 112.

Referring to FIG. 4C, as previously mentioned, volume records 200 that were previously good candidates for caching may become bad candidates for caching as the count values 202 change over time. One benefit of the apparatus and methods disclosed herein is the ability to dynamically optimize the organization of the VVDS 110. This maybe accomplished by continuing to monitor and reorganize the VVDS 110 according to the count values 202 as they change over time. FIG. 4C shows one example of the organization of volume records 200 and their count values 202 after further time has passed. In certain embodiments, the count values 202 may be reset to an initial value each time the records 200 are reorganized. In other embodiments, the count values 202 may retain their value immediately prior to the reorganization.

Figure 5:
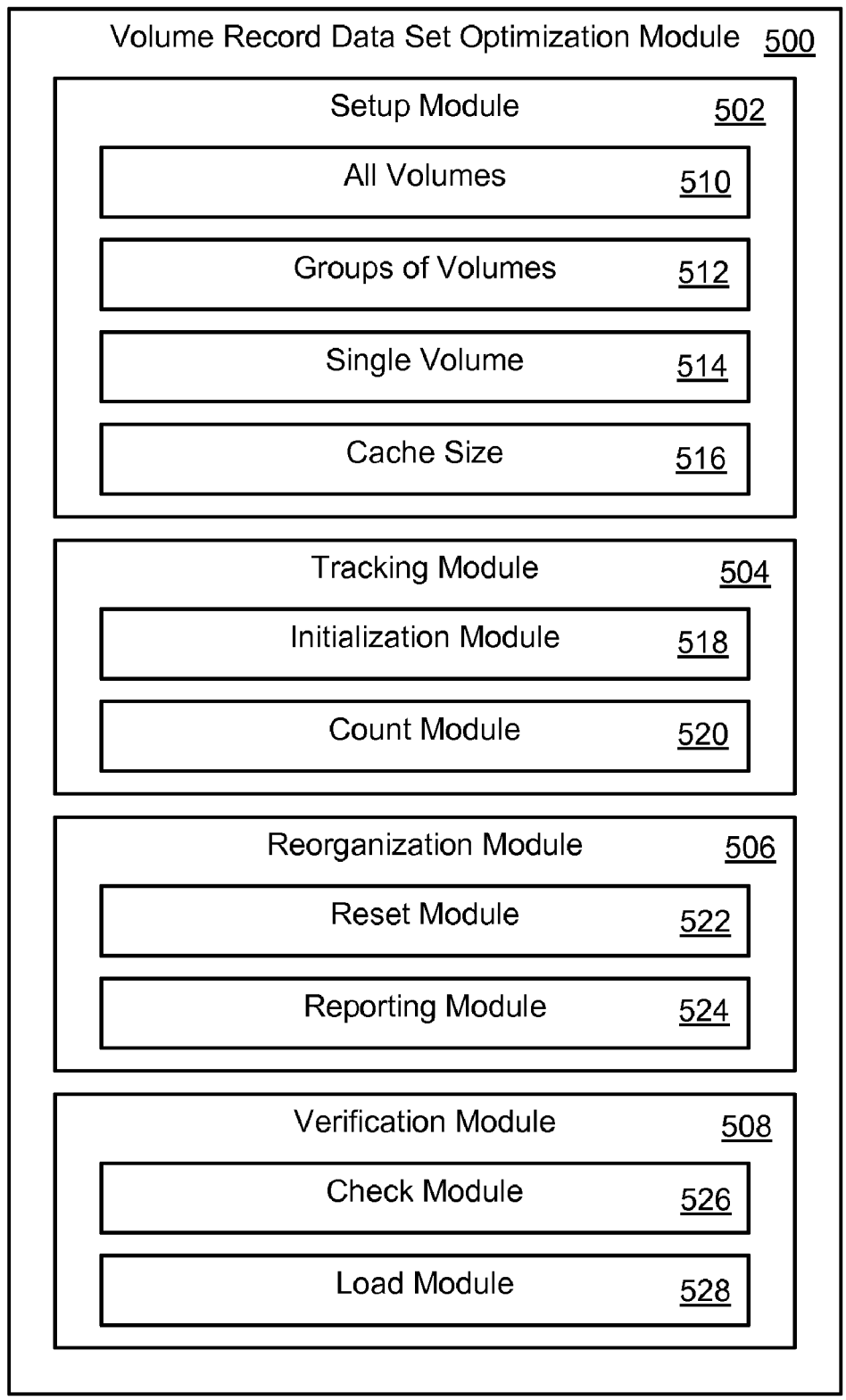
FIG. 5 is a high-level block diagram showing one embodiment of a volume record data set optimization module in accordance with the invention.

Referring to FIG. 5, in certain embodiments in accordance with the invention, a volume record data set optimization module 500 may be used to optimize the volume records 200 in a VVDS 110. In selected embodiments, the optimization module 500 may include a setup module 502, a tracking module 504, a reorganization module 506, and a verification module 508.

The setup module 502 may be used to establish various settings or parameters associated with the optimization module 500. For example, the setup module 502 may enable a user to enable/disable caching for specific volume data sets 110. Not all volume data sets 110 may be able to take advantage of the apparatus and methods disclosed herein.

In selected embodiments, there may be options or commands to enable/disable optimization for all volumes 510, groups of volumes 512 (e.g., volumes that match a particular pattern, share a particular label or portion of a label, etc.), or single volumes 514. In certain embodiments, this functionality may be implemented by providing Catalog or IDCAMS commands to enable/disable optimization for different volumes. IDCAMS commands may enable a volume for VVDS optimization without requiring these commands to be issued again (e.g., after an initial program load (IPL)), while catalog commands may allow these changes to occur without invoking IDCAMS.

In selected embodiments, the setup module 502 may also enable an administrator to designate a desired amount cache 112 in the coupling facility 105 to store VVDS volume records 200. In certain embodiments, the setup module 502 may enable a user to specify the amount of cache 112 for each SMS storage group or for all SMS-managed volumes 104, or designate an amount of cache 112 for non-SMS-managed volumes 104 that have VSAM data sets 108.

A tracking module 504 may be used to track the read and write activity with respect to particular data sets 108. In certain embodiments, the tracking module 504 may include an initialization module 518 to set the count values 202 to an initial value, such as zero or another suitable number. In certain embodiments, the initialization module 518 may initialize the count values 202 based on historical records (e.g., SMF records) as previously discussed. The tracking module 504 may also include a count module 520 to generate the count value 202 for each volume record 200 in a VVDS 110. The count module 520 may increase the count value 202 each time a read operation is performed to the associated data set 108, and decrease the count value 202 each time a write operation is performed to the associated data set 108.

A reorganization module 506 may reorganize the volume records 200 in a VVDS 110 according to count values 202. This may occur after the count values 202 have been updated for a period of time. The reorganization module 506 may perform the reorganization by reading the volume records 200 from the VVDS 110, sorting them, and re-writing the records 200 to the VVDS 110. The reorganization module 506 may perform this reorganization at specific time intervals or after the count values 202 have attained values that would necessitate reorganization. In certain embodiments, a reset module 522 may reset the count values 202 to an initial value or other suitable value after the reorganization has been performed. In certain embodiments, a reporting module 524 may generate a report indicating how a VVDS 110 has been changed by the optimization module 500. For example, the reporting module 524 may report which volume records 200 were moved to optimize caching, which count values 202 were pre-populated with values derived from SMF records, or the like.

In certain embodiments, a verification module 508 may be used to verify that selected records of VVDSs 110 that have been designated for optimization are actually stored in the cache 112. For example, in a read VVDS path, when reading a record 200 from a VVDS 110, a check module 526 may check to see if the VVDS 110 is designated for optimization. If so, an attempt may be made to access a requested record 200 from the coupling facility 105. If the record 200 is returned from the coupling facility 105, direct access to the record 200 in the storage device 106 (e.g., DASD) where the record is stored may be bypassed. If the record is not in the coupling facility 105 and is one that should be cached, a load module 528 may read the record 200 from the storage device 106 and load it into the coupling facility 105 for future use. In the write VVDS path, the check module 526 may make similar checks (i.e., whether the VVDS 110 is one that should be cached, whether the record in the VVDS 110 is one that should be cached, etc.). The load module 528 may then add/update/delete the record in the coupling facility 105 in addition to adding/updating/deleting the record 200 on the storage device 106 where appropriate.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for optimizing the organization of volume records stored in a volume record data set, the method comprising:

monitoring a volume comprising a plurality of data sets, each data set having associated therewith a volume record, each volume record stored in a volume record data set;

tracking read and write operations to each of the data sets over a period of time;

storing a count value in the volume record of each data set;

increasing the count value each time a read operation is performed to the associated data set;

decreasing the count value each time a write operation is performed to the associated data set; and reorganizing the volume records in the volume record data set according to the size of the count values.

2. The method of claim 1, further comprising caching volume records with the largest count values.

3. The method of claim 1, further comprising designating the volume as one that should be optimized.

4. The method of claim 1, further comprising initializing the count values according to historical records for read and write operations to the data sets.

5. The method of claim 1, further comprising resetting the count values after reorganizing the volume records.

6. The method of claim 1, further comprising generating a report indicating how the volume records are reorganized.

7. A computer program product for optimizing a plurality of volume records stored in a volume record data set, the computer program product comprising a computer-readable storage medium having computer-usable program code embodied therein, the computer-usable program code comprising:

computer-usable program code to monitor a volume comprising a plurality of data sets, each data set having associated therewith a volume record, each volume record stored in a volume record data set;

computer-usable program code to track read and write operations to each of the data sets over a period of time;

computer-usable program code to store a count value in the volume record of each data set;

computer-usable program code to increase the count value each time a read operation is performed to the associated data set;

computer-usable program code to decrease the count value each time a write operation is performed to the associated data set; and computer-usable program code to reorganize the volume records in the volume record data set according to the size of the count values.

8. The computer program product of claim 7, further comprising computer-usable program code to cache volume records with the largest count values.

9. The computer program product of claim 7, further comprising computer-usable program code to designate the volume as one that should be optimized.

10. The computer program product of claim 7, further comprising computer-usable program code to initialize the count values according to historical records of read and write operations to the data sets.

11. The computer program product of claim 7, further comprising computer-usable program code to reset the count values after reorganizing the volume records.

12. The computer program product of claim 7, further comprising computer-usable program code to generate a report indicating how the volume records are reorganized.

13. An apparatus for optimizing a plurality of volume records stored in a volume record data set, the apparatus comprising:

at least one processor;

at least one memory device coupled to the at least one processor and storing modules for execution on the at least one processor, the modules comprising:

a tracking module to monitor a volume comprising a plurality of data sets, each data set having associated therewith a volume record, each volume record stored in a volume record data set;

the tracking module further configured to track read and write operations to each of the data sets over a period of time;

a count module to store a count value in the volume record of each data set;

the count module further configured to increase the count value each time a read operation is performed to the associated data set;

the count module further configured to decrease the count value each time a write operation is performed to the associated data set; and a reorganization module to reorganize the volume records in the volume record data set according to the size of the count values.

14. The apparatus of claim 13, wherein the modules further comprise a caching module to cache volume records with the largest count values.

15. The apparatus of claim 13, wherein the modules further comprise a setup module to designate the volume for optimization.

16. The apparatus of claim 13, wherein the modules further comprise an initialization module to initialize the count values according to historical records of read and write operations to the data sets.

17. The apparatus of claim 13, wherein the modules further comprise a reset module to reset the count values after reorganizing the volume records.

18. The apparatus of claim 13, wherein the modules further comprise a reporting module to generate a report indicating how the volume records are reorganized.

* * * * *